Nov. 19, 1957  W. R. HARRY  2,813,947
REPEATING CIRCUIT INTERRUPTER
Filed Aug. 6, 1954  3 Sheets-Sheet 1

INVENTOR
WILLIAM R. HARRY
BY Arthur R. Woolfolk
ATTORNEY

Nov. 19, 1957  W. R. HARRY  2,813,947
REPEATING CIRCUIT INTERRUPTER
Filed Aug. 6, 1954  3 Sheets-Sheet 2

INVENTOR
WILLIAM R. HARRY
BY
ATTORNEY

United States Patent Office 2,813,947
Patented Nov. 19, 1957

2,813,947

REPEATING CIRCUIT INTERRUPTER

William R. Harry, Hartland, Wis., assignor to McGraw-Edison Company, a corporation of Delaware Application August 6, 1954, Serial No. 448,197

7 Claims. (Cl. 200—89)

This invention relates to reclosing lockout circuit interrupters.

In reclosing lockout circuit interrupters such as that shown in U. S. Patent No. 2,560,831, of July 17, 1951, Anthony Van Ryan and Carl Schindler, for Circuit Interrupter and assigned to the same assignee as the present invention, provision has been made for lockout after a plurality of operations, for instance when a permanent fault occurs. Usually the circuit interrupter is adjusted for different time current characteristics so that it may have one or more fast operations followed by retarded or slow operations, lockout occurring however only after the full sequence of operations have taken place in quick succession. These, and similar interrupters, have the defect, however, of subjecting the circuit interrupter and the associated apparatus protected thereby, such as the substation transformers and other equipment to high stresses due to high fault currents for the full number of operations of the circuit interrupter.

This invention is designed to overcome the above noted defects and objects of this invention are to provide means for reducing the high fault current interrupting duty on the reclosing lockout circuit interrupter, to reduce the number of applications of high fault current stresses, and to reduce the duration of high fault current stresses on the recloser and to reduce such stresses on substation transformers and other equipment protected by the circuit interrupter.

Embodiments of the invention are shown in the accompanying drawings in which.

Figure 1:
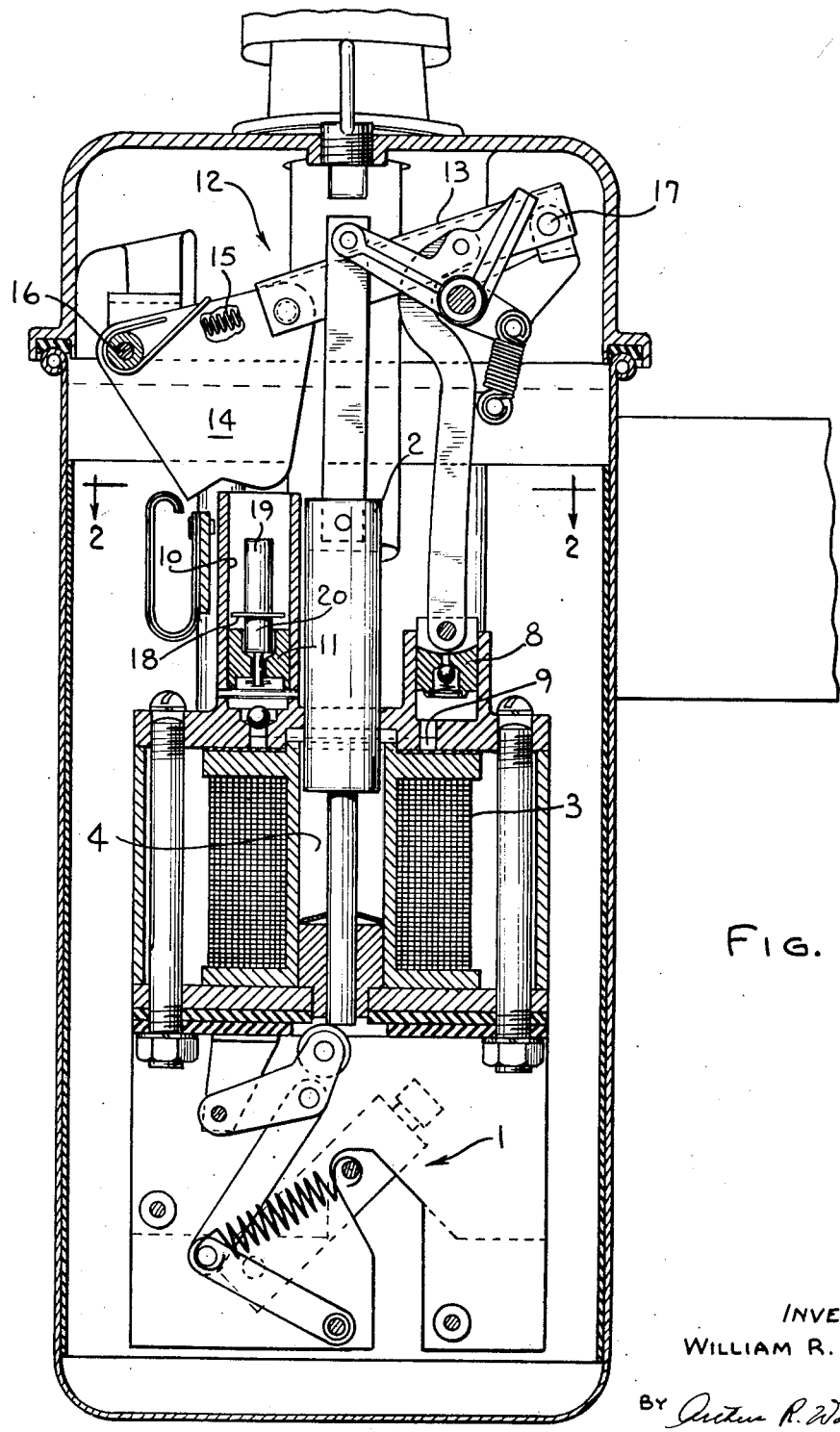
Figure 1 is a vertical sectional view through the interrupter.
Figure 2:
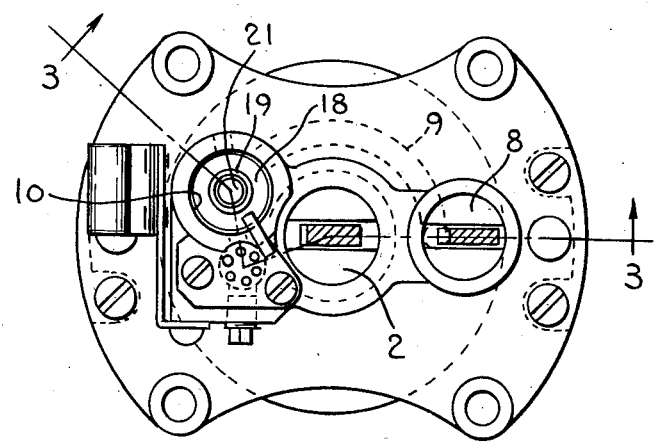
Figure 2 is a fragmentary sectional view on the line 2—2 of Figure 1.

Referring to the drawings it will be seen that the circuit interrupter comprises switch mechanism indicated generally by the reference character 1 which is actuated by means of a magnetic plunger 2 so that when the plunger is drawn downwardly upon energization of the electromagnet's coil 3 the switch mechanism is opened. The switch mechanism is connected in series with the coil 3 as described in detail in the above noted patent. The same general construction set forth in the above noted patent is followed in this disclosure and need not be described in detail as it is fully set forth in the above noted patent. The magnet plunger 2 operates within a cylinder 4 and displaces oil from around the plunger which oil passes up through the passageway 5, see Figure 3, and lifts slide valve 6 uncovering the vent opening 7.

Figure 3:
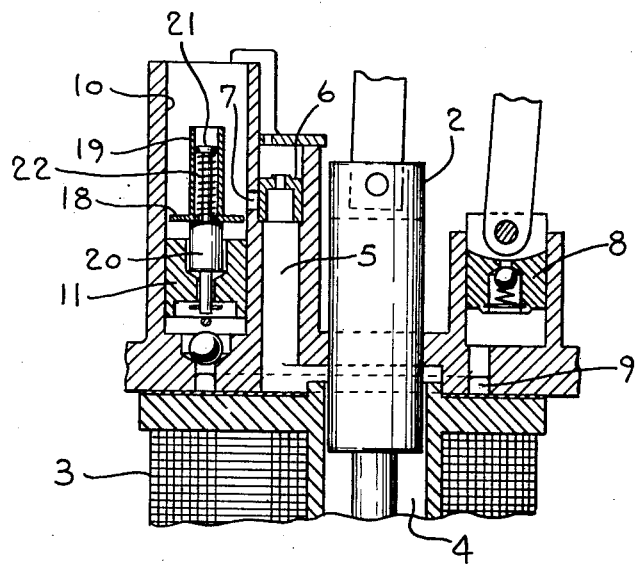
Figure 3 is a fragmentary sectional view on the line 3—3 of Figure 2.

On the down or opening stroke of the plunger 2 a pumping piston 8, see Figure 3, is moved downwardly and pumps a measured quantity of oil through the passageway 9 to the cumulative cylinder or measuring cylinder 10 beneath the counting or cumulative piston 11 and raises such piston in a step-by-step manner. Usually the circuit interrupters are set for a predetermined number of fast operations followed by a predetermined number of slow or delayed operations. For example, the circuit interrupter may be set for two fast operations followed by two slow operations, lockout occurring, for example, after four operations. The first two fast operations are accomplished by allowing the escaping oil to freely pass through the vent opening 7. After the two fast operations, it will be found that the piston 11 has closed the vent 7 and thereby causes two slow operations. This is fully described in the above noted patent.

If the operations occur in rapid sequence it will be found that the piston 11 has moved up far enough to trip the lockout mechanism indicated generally by the reference character 12 after the full series of operations have been executed. This is the normal mode of operation for the circuit interrupter. The lockout mechanism may consist of the toggle links 13 and 14 whose usual position is just below dead center. A spring 15 extends between the fixed pivot point 16 of the link 14 and the movable pivot point 17 of the link 13 as set forth in the above noted patent and tends to collapse the toggle link mechanism. The toggle link mechanism is arranged to lock in the position shown in Figure 1 just below dead center and to be upwardly urged for lockout and moved upwardly above dead center, all as described in the above noted patent. The lockout is produced by the moving of the link 14 upwardly past dead center by the counting piston 11 and elements carried thereby and constituting a part of the lockout piston assembly.

With the present invention it is not necessary for the circuit interrupter and the equipment protected thereby to be subjected to the full series of operations when an excessive overload occurs, for example ten or fifteen times rated current or five to seven and one half times minimum trip current. Obviously, the circuit interrupter may be adjusted for lockout for other excessively heavy overloads prior to final lockout in the normal operation of the circuit interrupter. These figures given are merely an example.

The lockout on the second fast operation is obtained by providing an auxiliary piston or member 18 which in reality may consist of a washer or similar member rigid with an upwardly extending tube 19, see Figure 3. The washer rests upon the valve 20 of the counting piston 11 under normal conditions and is guided on a headed pin 21 carried by the valve 20 of the counting piston 11. A spring 22 abuts the head of the pin at its upper end and urges the auxiliary piston 18 downwardly holding it in the position shown in Figure 3, under normal conditions.

The operation of the apparatus is as follows:

The parts are so made and proportioned, in the form chosen for illustration, that after the first fast operation the auxiliary piston 18 has been moved to a position such that the escaping oil from the orifice 7 will sweep or carry the auxiliary piston 18 upwardly provided an excessively heavy overload has occurred as set forth hereinabove. On the next or second fast operation the upwardly passing oil carries the auxiliary piston upwardly compressing the spring 22 and causes the upper end of the tube 19, see Figure 3, of the auxiliary piston 18 to strike the link 14 of the toggle link mechanism, see Figure 1, and thus cause lockout. It is to be noted however that under normal overload, less than the above noted predetermined value for example, lockout does not occur until the total number of operations for which the circuit breaker has been set have occurred.

Figure 4:
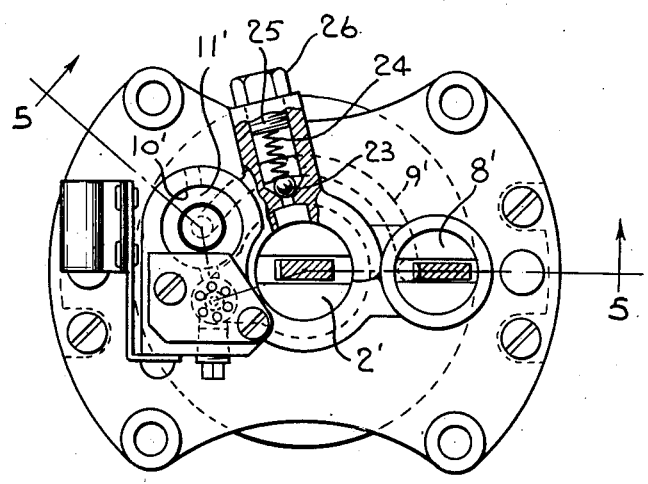
Figure 4 is a view corresponding to Figure 2 showing a further form of the invention.
Figure 5:
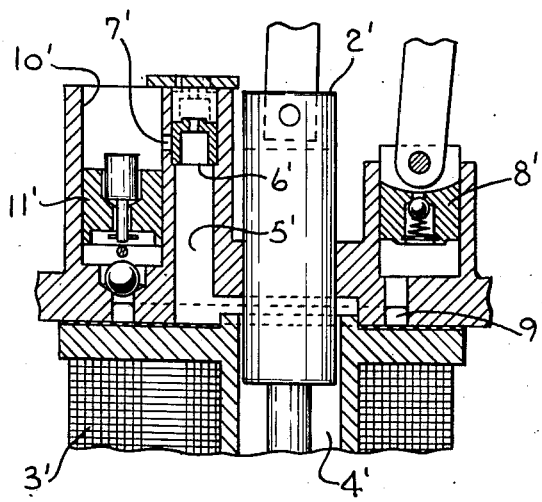
Figure 5 is a sectional view on the line 5—5 of Figure 4.
Figure 6:
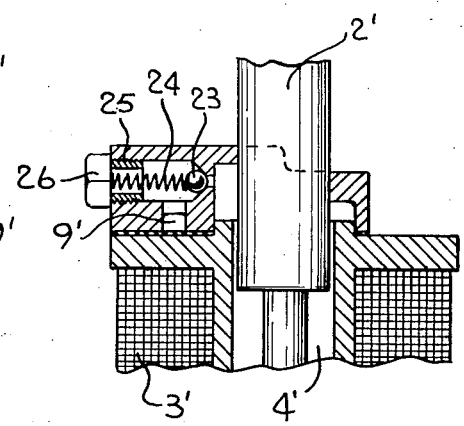
Figure 6 is a vertical sectional view through the spring loaded valve.

If the circuit interrupter had been set or designed for one fast operation only, another form of the invention would have to be employed since the escaping oil would be blocked by the auxiliary piston 11 after the first operation. This is readily accomplished by following the construction shown in Figures 4, 5 and 6, illustrating the second form of the invention.

In the second form of the invention a spring loaded valve 23 is interposed between the counting cylinder and passage 5 for the escaping oil from beneath the magnetic plunger 2. The pressure exerted by the spring 24, see Figure 6, is such that the valve 23 allows oil to pass directly from beneath the magnetic plunger 2' into the passage 9' corresponding to the passage 9 in the first form of the invention into the counting or cumulative cylinder 10' of the counting piston 11' provided the escaping orifice 7' is blocked by the counting piston 11'. Either the spring 24 is so chosen that relief occurs for the predetermined excessive overload or else the threaded plug 25 of the nut 26 may be arrranged for adjustment to secure the desired pressure for the spring 24. At all events under excessive overloads above a predetermined value the valve 23 is displaced and the oil from beneath the magnetic plunger 2 passes directly to a point beneath the counting piston 11 and thus raises the counting piston upwardly and trips the lockout mechanism. The spring pressure on the valve 23 is so chosen that the valve remains closed at all times except when fault currents greater than the predetermined values occur.

For details of construction neither shown nor described herein reference may be had to the above noted patent.

It will be seen that novel forms of circuit interrupters have been provided by this invention which reduce high fault current interrupting duty on the recloser and reduce the number of applications of high fault current stresses and reduces the duration of the high fault current stresses on equipment protected by the circuit interrupter.

I claim:

1. A repeating circuit interrupter comprising switch means, electromagnetic means including a single armature for opening said switch means on overload, lockout means, means for locking said circuit interrupter in open position after a predetermined number of operations occurring in rapid sequence, counting means for actuating said lockout means, and means including said armature responsive to excessively heavy overload above a predetermined value operatively engaging said lockout means on the occurrence of an overload above said predetermined value for actuating said lockout means prior to lockout due to operation of said counting means.

2. A repeating circuit interrupter comprising switch means, electromagnetic means for opening said switch means on overload, lockout means, means for locking said circuit interrupter in open position after a predetermined number of operations occurring in rapid sequence, hydraulic counting means for actuating said lockout means, and hydraulic means responsive to excessively heavy overload above a predetermined value operatively engaging said lockout means on the occurrence of an overload above said predetermined value for actuating said lockout means prior to lockout due to operation of said counting means.

3. A repeating circuit interrupter comprising switch means, electromagnetic means including an armature for opening said switch means, hydraulic means coacting with said armature and having venting means provided with an aperture through which a liquid is discharged upon actuation of said armature on overload, lockout means for locking said circuit interrupter in open position after a predetermined number of operations of said circuit interrupter occurring in rapid sequence, step-by-step hydraulic counting means for actuation of said lockout means, and auxiliary lockout actuating means carried by said counting means into a position to be actuated by fluid discharged through said aperture upon the occurrence of an excessively heavy overload above a predetermined value after said step-by-step counting means has been advanced at least one step.

4. A repeating circuit interrupter having a two time-current characteristic and comprising switch means, electromagnetic means for opening said switch means on overload, means for closing said switch means, hydraulic means controlling the opening of said switch means, said hydraulic means including a vent opening determining the delay in opening of said switch means, counting means controlling said vent opening, lockout means for locking said switch means in open position after a predetermined number of operations of said circuit interrupter occurring in rapid sequence, and lockout actuating means moved by said counting means to a position to be driven by fluid from said vent opening to actuate said lockout means upon the occurrence of an excessively heavy overload above a predetermined value.

5. A repeating circuit interrupter having a two time-current characteristic and comprising switch means, electromagnetic means for opening said switch means on overload, means for closing said switch means, hydraulic means controlling the opening of said switch means, said hydraulic means including a vent opening determining the delay in opening of said switch means, counting means controlling said vent opening, lockout means for locking said switch means in open position after a predetermined number of operations of said circuit interrupter occurring in rapid sequence, and lockout actuating means carried by said counting means and moved by said counting means to a position to be driven by fluid from said vent opening to actuate said lockout means upon the occurrence of an excessively heavy overload above a predetermined value.

6. A repeating circuit interrupter comprising switch means, electromagnetic means for opening said switch means on overload, means for closing said switch means, lockout means for locking said circuit interrupter in open position after a predetermined number of operations of said circuit interrupter occurring in rapid sequence, hydraulic counting means for actuating said lockout means, said electromagnetic means including a liquid-displacing means and a cylinder for said liquid-displacing means, and a spring loaded valve interposed between said cylinder and said hydraulic counting means and arranged to open and allow liquid to pass to said counting means upon the occurrence of an excessively heavy overload above a predetermined value.

7. A repeating circuit interrupter comprising switch means, electromagnetic means for opening said switch means on overload, said electromagnetic means including a coil and a plunger, a cylinder for said plunger arranged to contain a liquid, step-by-step hydraulic counting means, lockout means movable by said step-by-step hydraulic counting means after a predetermined number of operations of said circuit interrupter occurring in rapid succession, and a normally closed loaded valve interposed between said step-by-step counting means and said cylinder and arranged to open upon the occurrence of an excessively heavy overload above a predetermined value to thereby cause said counting means to actuate said lockout means prior to said predetermined number of operations of said circuit interrupter.

References Cited in the file of this patent

UNITED STATES PATENTS

| | | |
|---|---|---|
| 2,274,350 | Thumin | Feb. 24, 1942 |
| 2,353,470 | Ileman | July 11, 1944 |
| 2,475,765 | Wallace et al. | July 12, 1949 |
| 2,503,154 | Graves | Apr. 4, 1950 |
| 2,560,831 | Van Ryan et al. | July 17, 1951 |